(12) United States Patent
Sieve et al.

(10) Patent No.: US 10,711,829 B2
(45) Date of Patent: Jul. 14, 2020

(54) SLEEVE JOINT, IN PARTICULAR FOR A VEHICLE

(71) Applicant: ZF Friedrichshafen AG, Friedrichshafen (DE)

(72) Inventors: Manfred Sieve, Lohne (DE); Jan Pabst, Osnabrück (DE); Volker Grube, Diepholz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/340,872

(22) PCT Filed: Sep. 19, 2017

(86) PCT No.: PCT/EP2017/073560
§ 371 (c)(1),
(2) Date: Apr. 10, 2019

(87) PCT Pub. No.: WO2018/072947
PCT Pub. Date: Apr. 26, 2018

(65) Prior Publication Data
US 2019/0242428 A1 Aug. 8, 2019

(30) Foreign Application Priority Data

Oct. 19, 2016 (DE) .................. 10 2016 220 438

(51) Int. Cl.
*F16C 11/06* (2006.01)

(52) U.S. Cl.
CPC ...... *F16C 11/0614* (2013.01); *F16C 11/0685* (2013.01); *F16C 11/0661* (2013.01);
(Continued)

(58) Field of Classification Search
CPC ... F16C 11/0614; F16C 11/671; F16C 11/685; F16C 23/045; F16C 2326/05; F16C 2326/24
See application file for complete search history.

(56) References Cited

U.S. PATENT DOCUMENTS 4,571,811 A * 2/1986 Pruvost ................... B29C 61/02
264/230
5,242,228 A * 9/1993 Hattori ................ F16C 11/0614
384/145

(Continued)

FOREIGN PATENT DOCUMENTS

| DE | 1 955 718 | 2/1967 |
|---|---|---|
| DE | 103 48 787 B3 | 11/2004 |
| DE | 10 2007 016 171 A1 | 10/2008 |
| DE | 10 2010 041 306 A1 | 3/2012 |
| DE | 10 2011 054 631 A1 | 1/2013 |
| DE | 10 2012 207 527 A1 | 11/2013 |

(Continued)

OTHER PUBLICATIONS

German Search Report Corresponding to 10 2016 220 438.6 dated Jan. 10, 2018.

(Continued)

*Primary Examiner* — Phillip A Johnson
(74) *Attorney, Agent, or Firm* — Davis & Bujold PLLC; Michael J. Bujold

(57) ABSTRACT

A sleeve joint (1), in particular for a vehicle, having an outer sleeve (3) which receives and secures a ball socket (9), in an axial direction. The ball socket (9) is composed of a plastics material for engagement with an inner ball joint body (5). The ball socket (9) extends radially as far as an inner wall (11) of the outer sleeve, such that the ball socket (9) is supported directly on the outer sleeve (3).

16 Claims, 7 Drawing Sheets

(52) U.S. Cl.
CPC ....... *F16C 11/0671* (2013.01); *F16C 2220/04* (2013.01); *F16C 2326/05* (2013.01); *F16C 2326/24* (2013.01)

(56) References Cited

U.S. PATENT DOCUMENTS

| | | | |
|---|---|---|---|
| 5,364,191 A * | 11/1994 | Gruber | B62D 7/16 384/153 |
| 5,775,815 A | 7/1998 | Abusamra | |
| 9,181,975 B2 | 11/2015 | Rechtien et al. | |
| 9,541,123 B2 | 1/2017 | Broeker et al. | |
| 2009/0080818 A1 | 3/2009 | Sasaki et al. | |
| 2013/0025087 A1 | 1/2013 | Jang et al. | |
| 2014/0016888 A1 * | 1/2014 | Harper | F16C 33/74 384/147 |

FOREIGN PATENT DOCUMENTS

| | | |
|---|---|---|
| EP | 2 642 141 A1 | 9/2013 |
| GB | 2 344 850 A | 6/2000 |
| JP | S62-8805 A | 1/1987 |
| JP | H04-25610 A | 1/1992 |
| JP | H05-306711 A | 11/1993 |
| JP | H06-51538 U | 7/1994 |
| JP | H07-127628 A | 5/1995 |
| WO | 2012/038180 A1 | 3/2012 |

OTHER PUBLICATIONS

International Search Report Corresponding to PCT/EP2017/073560 dated Jan. 2, 2018.

Written Opinion Corresponding to PCT/EP2017/073560 dated Jan. 2, 2018.

* cited by examiner

SLEEVE JOINT, IN PARTICULAR FOR A VEHICLE

This application is a National Stage completion of PCT/EP2017/073560 filed Sep. 19, 2017, which claims priority from German patent application serial no. 10 2016 220 438.6 filed Oct. 19, 2016.

FIELD OF THE INVENTION

The invention relates to a sleeve joint.

BACKGROUND OF THE INVENTION

From DE 10 2012 207 527 A1 a sleeve joint is known, which comprises an inner ball sleeve and an outer sleeve. Between the two sleeve elements is arranged a ball socket for the ball sleeve. An inner sleeve supports the ball socket on the outer sleeve. The components present in the outer sleeve are secured axially by locking rings at the ends, which are in each case braced against the inner sleeve by rolling over the outer sleeve at the ends.

All the components are brought into the production process as individual parts, which are closed in by the rolling-over process. The friction torque between the ball sleeve and the ball socket can be adjusted by the axial prestressing of the locking rings.

The advantage of such a sleeve joint is that components that are in some way defective, for example having incorrect friction, can be dismantled again by puncturing the outer sleeve. Their disadvantage, however, is the number of components involved and the consequent cost and complexity of assembly.

SUMMARY OF THE INVENTION

The purpose of the present invention is develop further a sleeve joint with a view to optimizing its production process.

This objective is achieved if the ball socket extends radially as far as an inside wall of the outer sleeve, so that the ball socket is supported directly on the outer sleeve.

The great advantage of the invention is that compared with the prior art mentioned, the number of components needed is drastically reduced.

According to a further advantageous feature, the outer sleeve has a rim facing radially inward which, with the ball socket, forms an interlocking connection. This interlocking connection prevents any lateral drifting of the ball socket out of the outer sleeve.

According to the claims, it is provided that the ball socket extends over the outer sleeve and has a holding groove for a sealing bellows. This saves an additional component previously required for attaching the sealing bellows.

With a view to comprehensive corrosion protection, at least an inner shell surface of the bent-over rim is covered by the ball socket. Particularly at end faces, defects are formed during surface coating with paint or, for example, by galvanizing, which surfaces are now in fact no longer exposed to environmental influences.

To increase the axial load-bearing ability of the sleeve joint, an angle enclosed by the inside wall of the outer sleeve and the bent-over rim is smaller than or equal to 90°. By choosing an angle of that size, under radial loading the bent-over rim would first have to be pushed up by more than 90° before the ball socket can move out of the predetermined fitting position within the outer sleeve.

Having regard to a simple design of a production device, the inner ball joint body has a holding groove for the sealing bellows, such that the maximum diameter of the groove profile is smaller than the smallest diameter of the ball socket. In that way a device slider can move past onto the fixing groove in the direction of the ball socket.

Optionally, the outer sleeve can have an interlocking profile in the direction of the ball socket, in order to prevent any relative rotational movement between the ball socket and the outer sleeve.

Preferably, the interlocking profile is formed by at least one, at least segment-like flange. Of course the flange can be circular and extend over the entire circumference of the outer sleeve.

With a view to the most flexible possible production the inside diameter of the outer sleeve in the area of the bent-over rim is at least as large as the maximum diameter of the ball joint body. Thus, the ball joint body can be pushed into a finish-machined outer sleeve in order to continue the subsequent assembly.

The ball socket is preferably made of a fiber-reinforced plastic. The fiber content increases the strength of the ball socket. Preliminary tests have shown that with a fiber content of around 30% a good compromise between strength and sliding properties can be achieved. Alternatively, the ball socket can be made of glass-bead-reinforced plastic.

Basically, it would be possible for the fibers to be made of a glass-like material. For optimum friction properties, however, fibers of a carbon material have given better results.

Optionally, the outer sleeve has a connection opening for the introduction of liquid plastic. The connection opening produces no visual blemish since in most application cases the outer sleeve is press-fitted into a supporting component, so that the connection opening is covered.

A further measure for simplifying the production of the ball joint consists in inserting the ball joint body into the outer sleeve and holding it in a definite position in an injection die, so that the ball socket is produced by injecting an injectable plastic composition which fills a free space between the ball joint body and the outer sleeve.

Thus, the ball socket is not produced as a solid component, but only produced by injection-molding in a device in which the outer sleeve and the ball joint body are already fixed.

In a first embodiment of the method the plastic composition is injected through the connection opening into the free space. This variant makes little demands on the injection device.

Alternatively, the possibility exists of injecting the plastic composition via an annular gap between the outer sleeve and the ball joint body. This simplifies the outer sleeve. In addition, theoretically the entire end face of the ball socket can serve as an injection-molding cross-section so that the plastic volume can be introduced into the device in a very short cycle time.

With regards to reducing the friction torque inside the ball joint it has been found to be very effective for the ball joint to undergo a post-heating operation following the injection-molding process.

Preferably, the bent-over rim of the outer sleeve is given its shape before the injection-molding process of the plastic composition. In that way the outer sleeve can be fully finish-machined and then moved on to the rest of the production process.

BRIEF DESCRIPTION OF THE DRAWINGS

The invention is explained in greater detail with reference to the description of the following figures, which show.

DETAILED DESCRIPTION OF THE PREFERRED EMBODIMENTS

Figure 1:
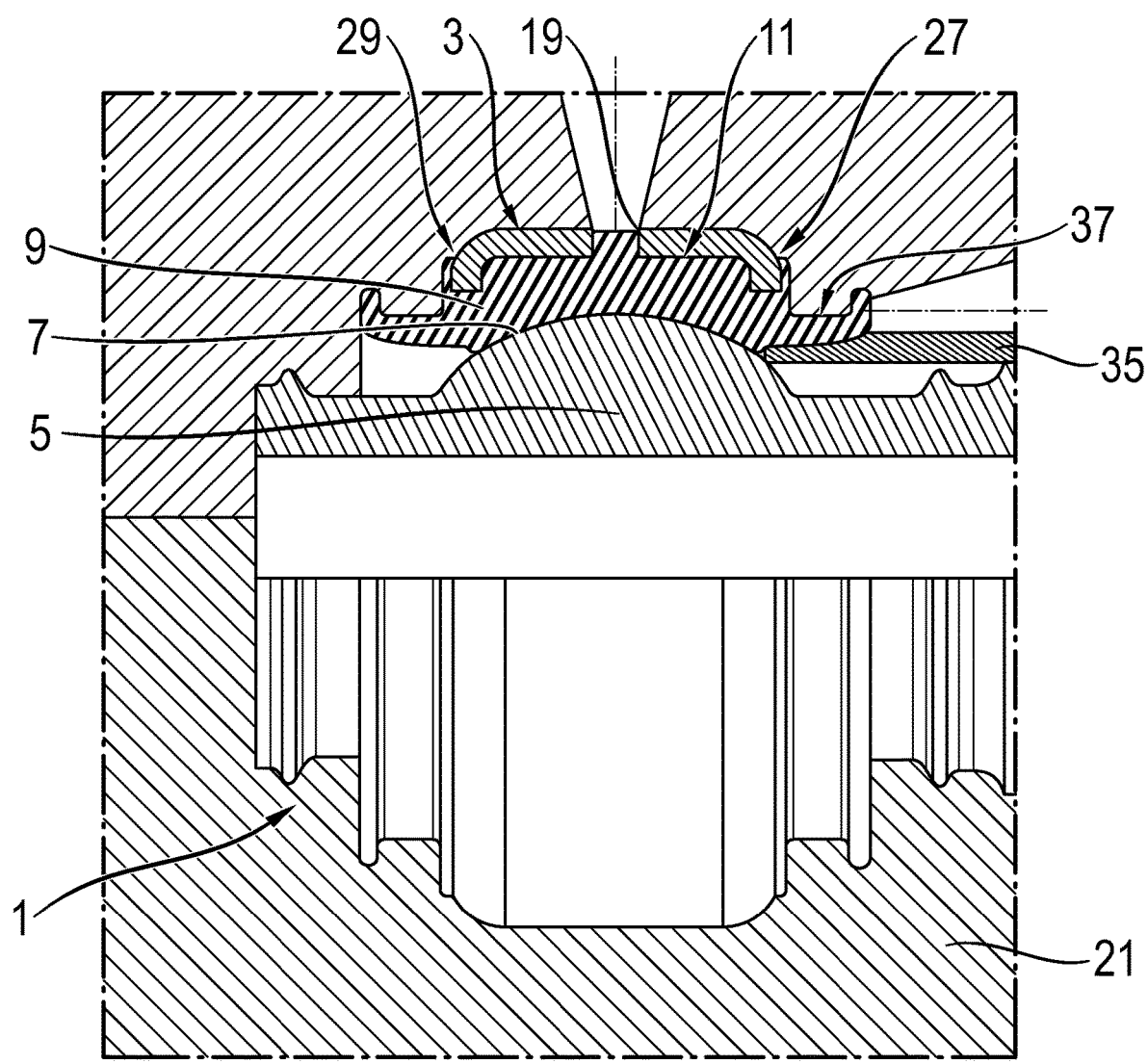
FIG. 1 Sleeve joint in an injection-molding device,
FIGS. 2-3 Detail of the outer sleeve,
FIG. 4 Sleeve joint in an intermediate stage of assembly,
FIG. 5 View of the sleeve joint of FIG. 1,
FIGS. 6, 6A, 7, 7A A further development of the outer sleeve of the sleeve joint,
FIGS. 8, 8A An outer sleeve with an all-round groove,
FIGS. 9, 9A An outer sleeve with two all-round grooves.

FIG. 1 shows a sleeve joint 1 with a metallic outer sleeve 3 and an inner ball joint body 5. The ball joint body 5 extends through the outer sleeve 3 on both sides, so that the ball profile, in cross-section, is only limited to a ball section 7. In this example the ball joint body 5 is in the form of a sleeve, but a solid component can be used just as well. Between the ball joint body 5 and the outer sleeve 3 is arranged a ball socket made of a plastic material. The ball socket 9 is supported on one hand directly on the ball joint body 5 and on the other hand directly on an inside wall 11 of the outer sleeve 3, so that the ball socket 9 is also supported directly on the outer sleeve 3.

The plastic material is fiber-reinforced, preferably with glass fibers or carbon fibers. Alternatively, the plastic material can be reinforced with glass beads.

Figure 2:
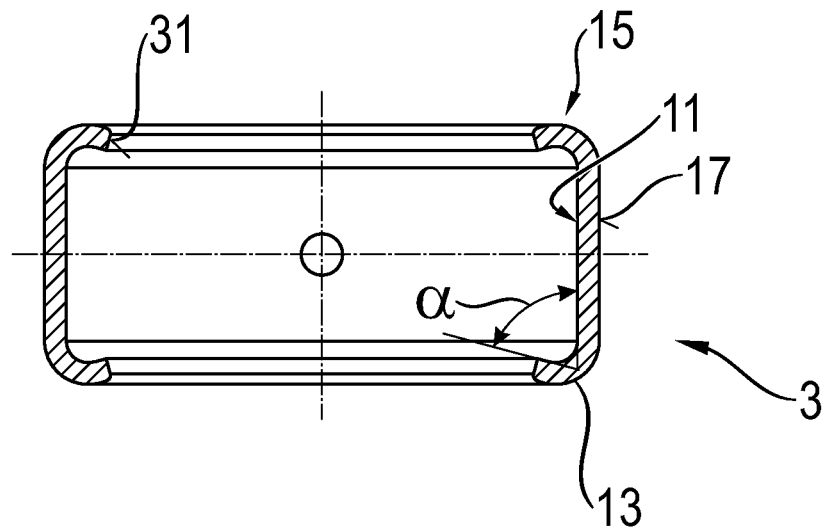
Figure 3:
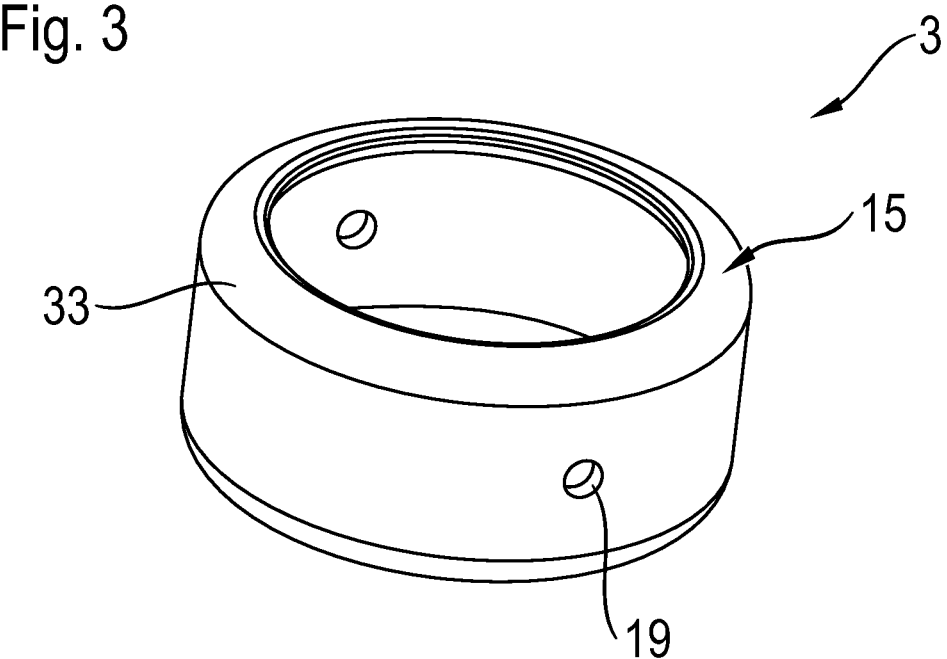

In FIGS. 2 and 3 the outer sleeve 3 is shown as an individual component having a rim 13; 15 at each end bent over radially inward. An angle α enclosed between the inside wall 11 of the outer sleeve 3 and the bent-in rim 13; 15 should preferably be smaller than or equal to 90° (see FIG. 2). Furthermore, particularly in FIG. 3 in the area of a shell surface 17 a connection opening 19 for the injection of liquid plastic can be seen. The outer sleeve is prefabricated as a separate component and passed on to the remainder of the production process.

Figure 4:
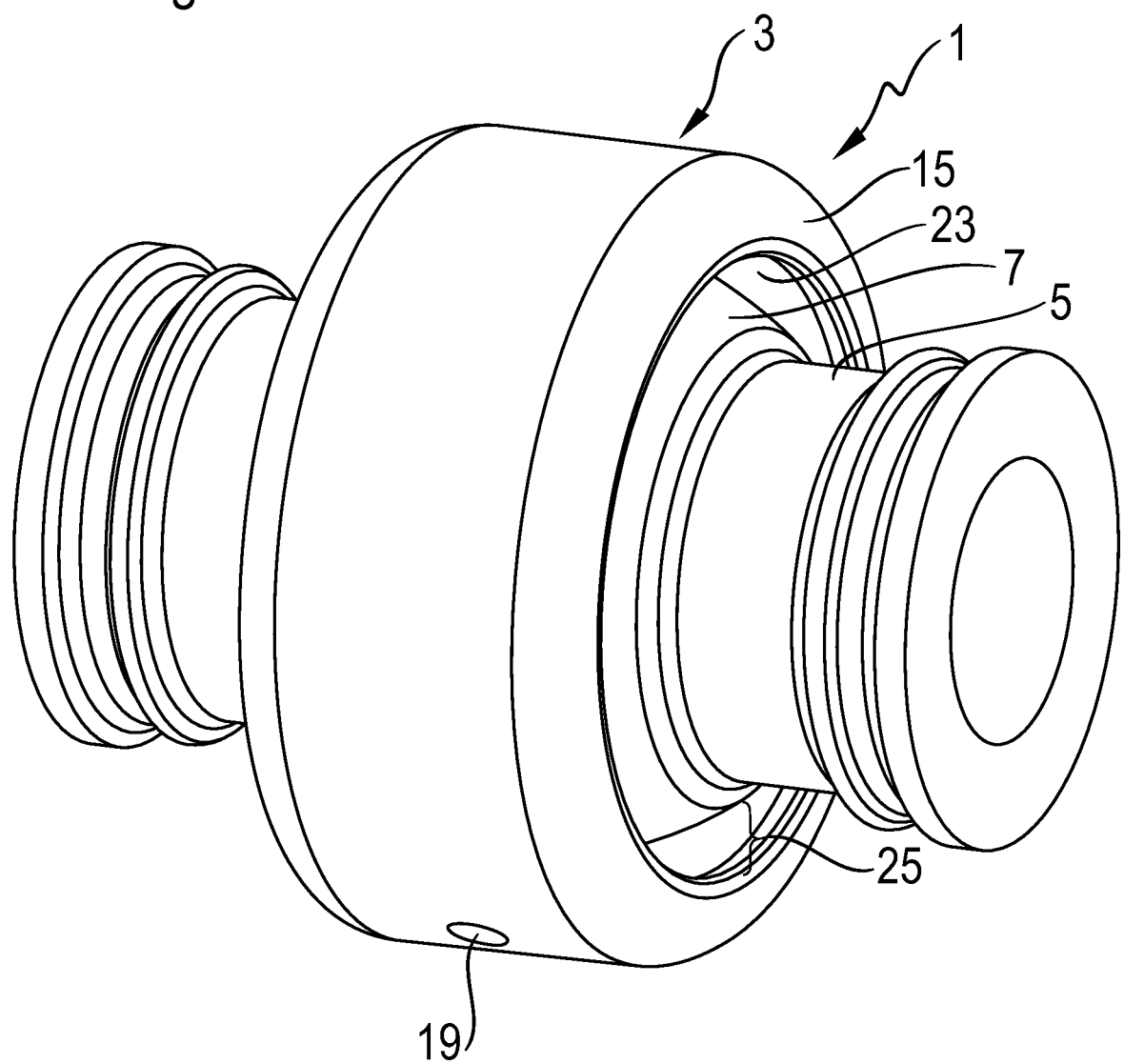

As shown by an overall view of FIGS. 1 and 4, the inside diameter of the outer sleeve 3 in the area of the bent-over rim 13; 15 is at least as large as the maximum diameter of the ball joint body 5, in particular that of the ball section 7. This makes it possible to insert the ball joint body 5 into the outer sleeve 3 even when the rim 13; 15 on the outer sleeve 3 is already fully formed. FIG. 4 shows an intermediate assembly condition in which the ball joint body 5 has been pushed into the outer sleeve 3 but the ball socket 9 has not yet been produced.

In the intermediate assembly condition according to FIG. 4, the still unfinished assembly is placed in a defined position in an injection-molding die 21. In this, there is a free space 23 for the ball socket 9 to be produced by an injection-molding process, in which an injection-moldable plastic composition fills the free space 23 in accordance with the shape produced by the injection-molding die 21. The plastic composition can be injected by way of the connection opening 19 in the outer sleeve 3 or even by way of an annular gap 25 between the outer sleeve 3 and the ball joint body 5. The inherent elasticity of the ball socket 9 can be determined by virtue of various process parameters such as holding pressure and/or injection pressure of the plastic composition.

Figure 5:
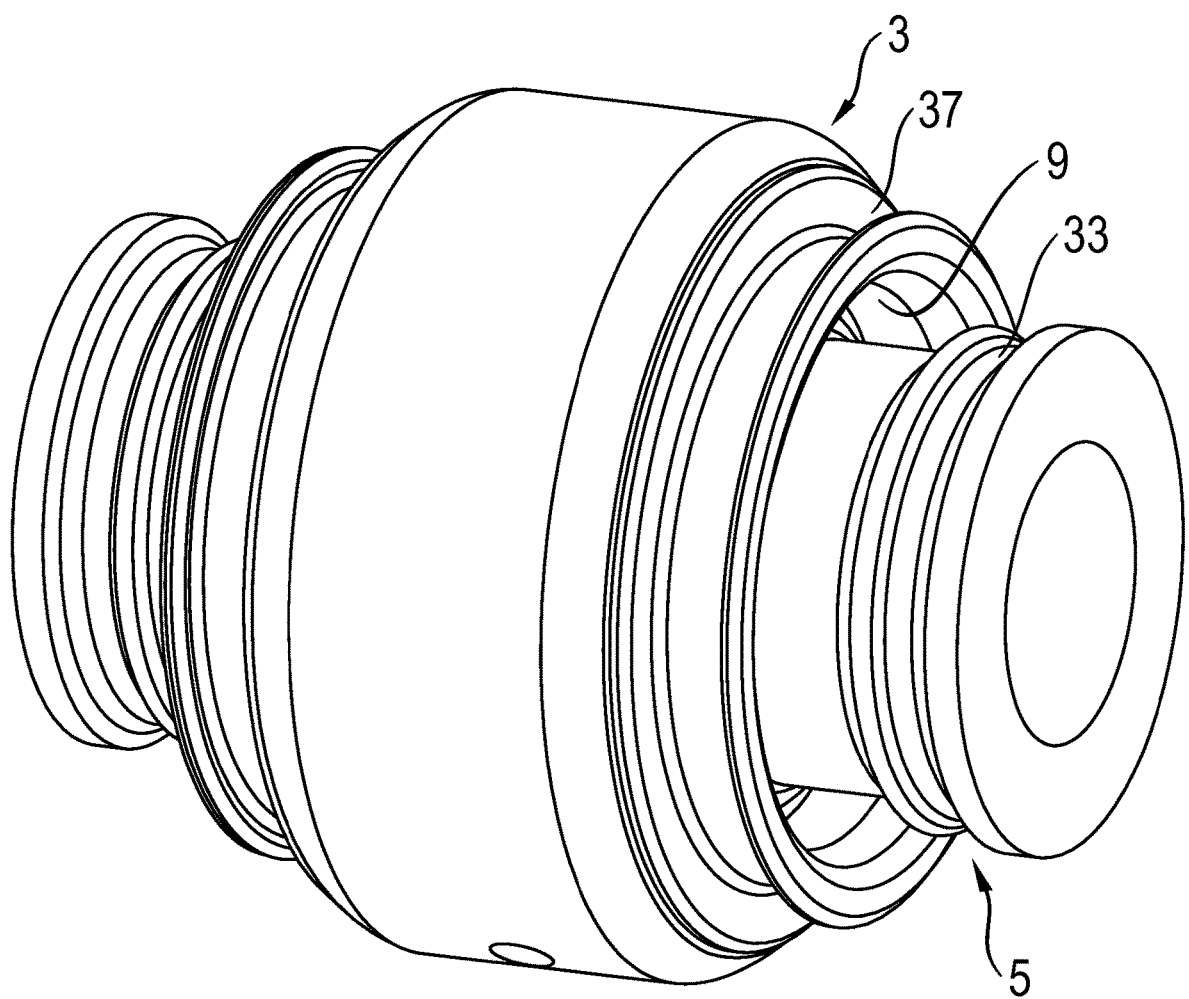
Figure 6:
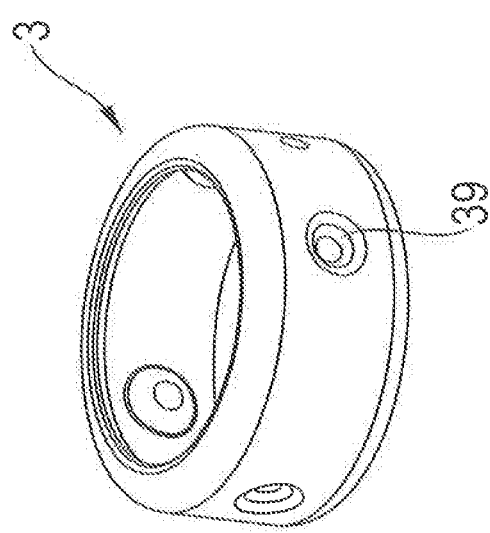
Figure 6A:
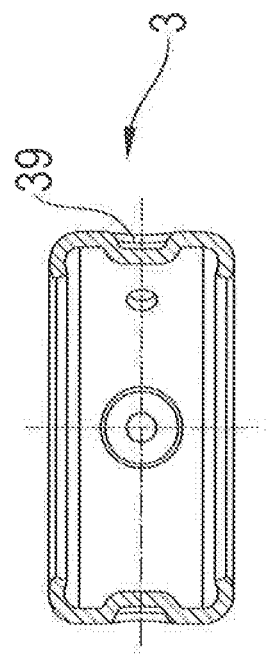
Figure 7:
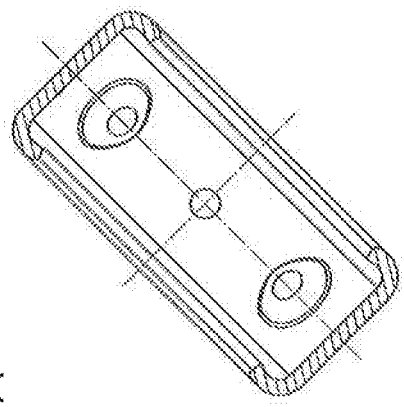
Figure 7A:
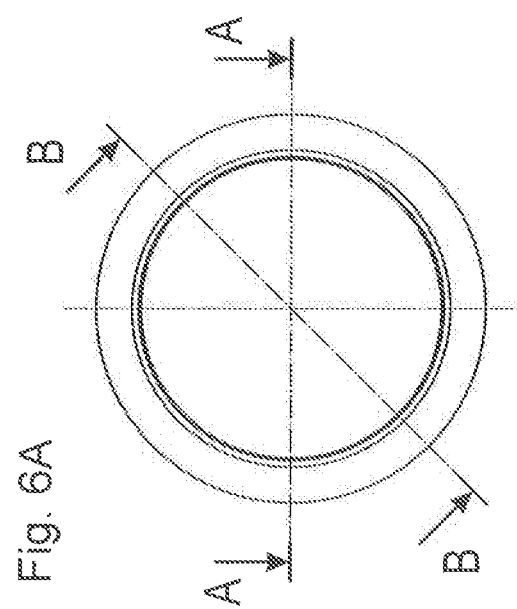

In the finished condition shown in FIGS. 1 and 5, the rim 13; 15 facing inward forms in each case an interlock connection 27; 29 with the ball socket 9. Here, an inside shell surface and even a cover surface 31 of the bent-over rim 13; 15 can be covered by the plastic composition of the ball socket and in that way can protect a particularly corrosion-critical area (see FIGS. 2 and 3).

FIG. 5 in particular shows a holding groove 33 in the ball joint body 5 for a sealing bellows (not shown) designed to cover the free area of the ball joint body 5 so that no dirt can make its way into the contact area between the ball socket 9 and the ball joint body 5. By showing a slider (see FIG. 1) inside the injection-molding die 21 it can be seen that the ball socket 9 extends axially over the outer sleeve 3 and has a holding groove 37 for the sealing bellows. A maximum diameter of the holding groove 33 is made smaller than the smallest diameter of the ball socket 9 outside the contact surface. Consequently, a comparatively simple die configuration can be provided in order to produce even more extensive geometries.

After the end of the injection-molding process of the plastic composition, a post-heating operation can also be carried out. Depending on the component configuration, the sleeve joint 1 is tempered for a few minutes or even for a longer time at between 40° C. and 80° C. In this way the component as a whole can set, which substantially improves the friction behavior of the sleeve joint 1.

FIGS. 6, 6A, 7 and 7A present a further development of the outer sleeve 3, in which an interlocking profile 39 is formed in the design of at least one, at least segment-like flange. The basic shape of the outer sleeve 3 is identical to the design according to FIGS. 1 to 5. The flanges 39 are intended to ensure that no relative rotational movement can ever take place between the outer sleeve 3 and the ball socket 9. Furthermore, thereby higher axial forces can also be withstood by the sleeve joint 1. Circular flanges, but also curved flanges can be provided. The representation is to be understood as showing only an example.

After the ball joint 1 has been removed from the injection-molding die 21, as already described a post-heating operation can be carried out. However, the sleeve joint can already fulfill its basic function and for that does not require any finish-machining. Finally, the sealing bellows is fixed into the holding grooves 33; 37 of the ball socket 9 and the ball joint body 5.

Figure 8A:
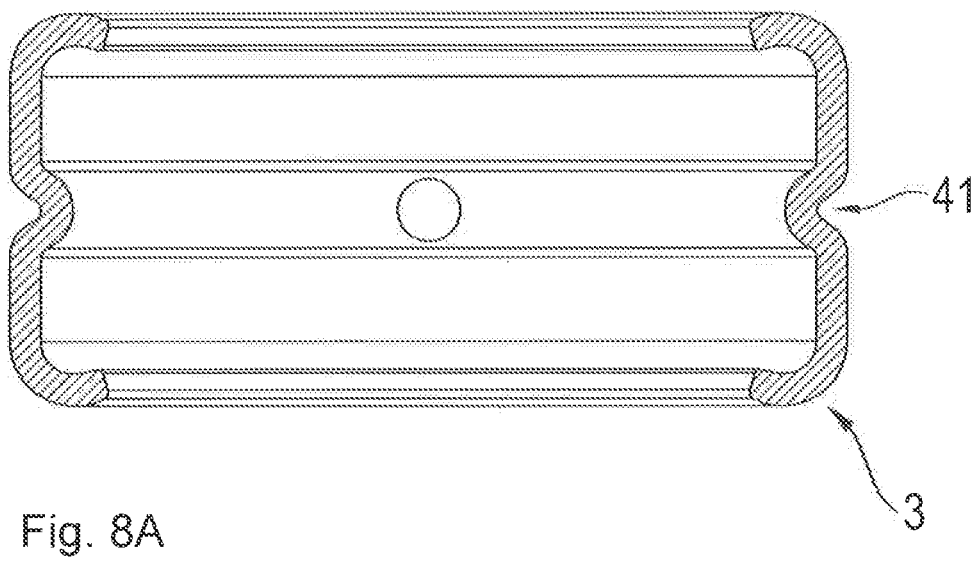
Figure 8:
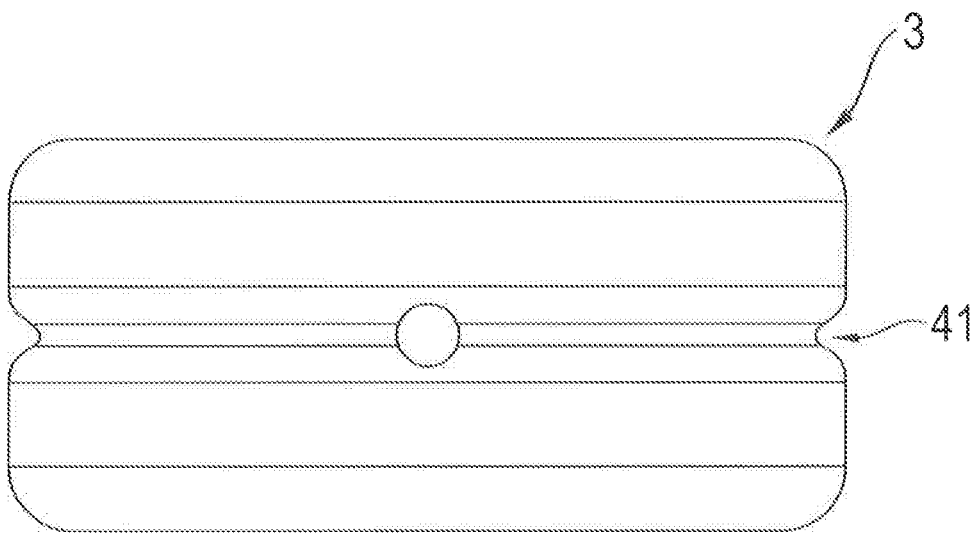
Figure 9A:
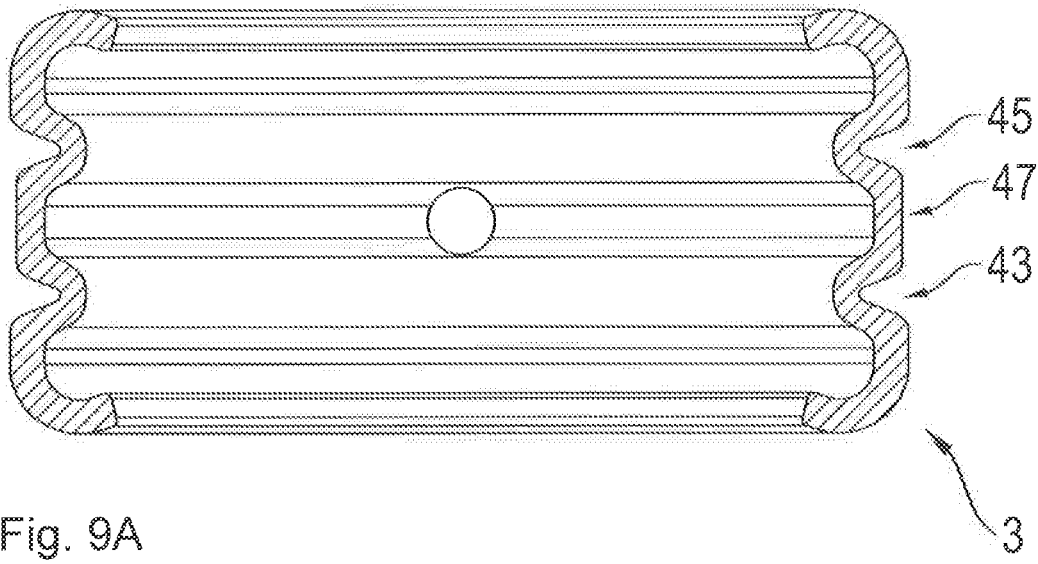
Figure 9:
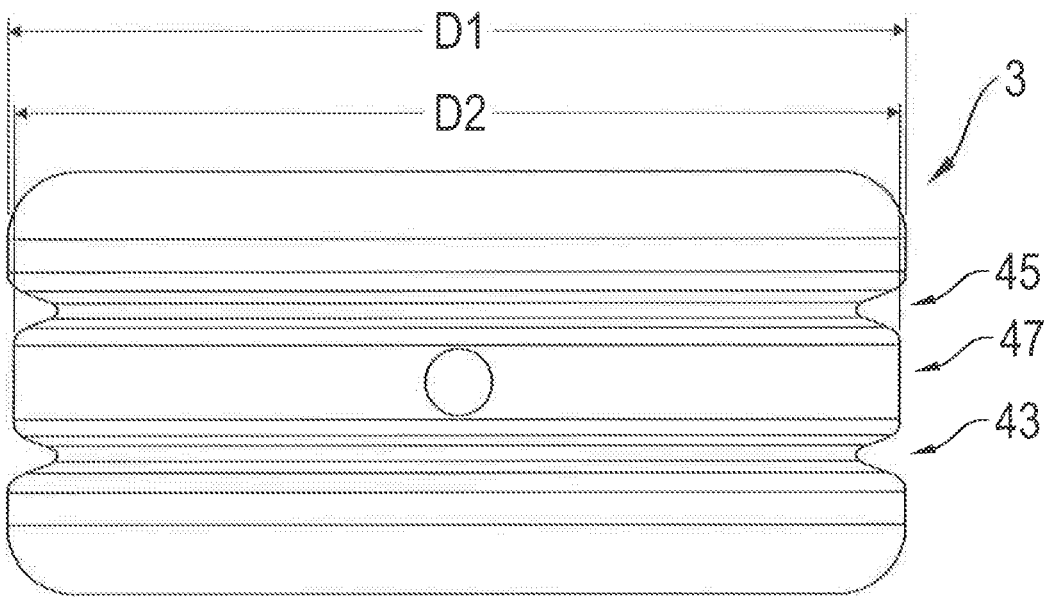

FIGS. 8, 8A, 9 and 9A show further possible variants of the outer sleeve 3, each represented in section (FIGS. 8A, 9A) and viewed laterally from above (FIGS. 8, 9). In the variant shown in FIGS. 8 and 8A the outer sleeve 3 is provided with an all-round groove 41 in the central area ("equator area"). The all-round groove 41 separates the outer sleeve 3 into two areas of equal size.

In the variant shown in FIGS. 9 and 9A, the outer sleeve 3 is provided with two all-round grooves 43, 45. The all-round grooves 43, 45 are a distance apart from one another and are respectively separated uniformly by a central area 47 ("equator area") of the outer sleeve 3 (symmetrically relative to the equator area). As indicated by the dimensions shown in the lateral view from above, the equator area between the grooves 43, 45 had an outer diameter D2 which is smaller than the respective outer diameters D1 of the edge areas of the outer sleeve 3 located outside the equator area.

Both of the variants shown in FIGS. 8, 8A and 9, 9A have the advantage that owing to the design of the central area, the outer sleeve 3 contributes toward reducing the torques of the sleeve joint, particularly in the condition after fitting. The reduction results from the fact that in the press-fitted condition of the joint, the central area is less severely deformed.

INDEXES

1 Sleeve joint
3 Outer sleeve
5 Ball joint body
7 Ball section
9 Ball socket
11 Inside wall
13 Rim
15 Rim
17 Shell surface
19 Connection opening
21 Injection-molding die
23 Free space
25 Annular gap
27 Interlocking connection
29 Interlocking connection
31 Inside shell surface
33 Holding groove
35 Slider
37 Holding groove
39 Interlocking profile
41 Groove
43 Groove
45 Groove

The invention claimed is:

1. A sleeve joint comprising:
an outer sleeve which accommodates a ball socket, made of a plastic material, for an inner ball joint body and secures the inner ball joint body in an axial direction, and
the ball socket extending radially as far as an inside wall of the outer sleeve so that the ball socket is supported directly by the outer sleeve; and
the ball socket extends axially over the outer sleeve and has a holding groove for a sealing bellows.

2. The sleeve joint according to claim 1, wherein the inner ball joint body has a holding groove for the sealing bellows, and a maximum diameter of a groove profile is smaller than a smallest diameter of the ball socket.

3. The sleeve joint according to claim 1, wherein the outer sleeve has an interlocking profile in a direction of the ball socket.

4. The sleeve joint according to claim 3, wherein the interlocking profile is formed by at least one segment-like flange.

5. The sleeve joint according to claim 1, wherein the ball socket is made from either a fiber-reinforced plastic or a bead-reinforced plastic.

6. The sleeve joint according to claim 5, wherein fibers of the fiber-reinforced plastic consist of a carbon material.

7. The sleeve joint according to claim 1, wherein the outer sleeve has a connection opening for introduction of molten plastic.

8. A method for producing a sleeve joint according to claim 1, the method comprising:
inserting the ball joint body into the outer sleeve and holding the ball joint body in a defined position in an injection-molding die, and
producing the ball socket by introducing an injection-moldable plastic composition which fills a free space between the ball joint body and the outer sleeve.

9. The method according to claim 8, further comprising the plastic composition is injected into the free space though a connection opening in the outer sleeve.

10. The method according to claim 8, further comprising the plastic composition is injected through an annular gap between the outer sleeve and the ball joint body.

11. The method according to claim 8, further comprising after the injection-molding process, subjecting the sleeve joint to a post-heating operation.

12. The method according to claim 8, further comprising forming the radially inwardly extending rim of the outer sleeve before the injection-molding process of the plastic composition.

13. A sleeve joint comprising:
an outer sleeve which accommodates a ball socket, made of a plastic material, for an inner ball joint body and secures the inner ball joint body in an axial direction,
the ball socket extending radially as far as an inside wall of the outer sleeve so that the ball socket is supported directly by the outer sleeve, and
the outer sleeve has a rim extending radially inward, and the rim is received within an interlocking connection of the ball socket.

14. The sleeve joint according to claim 13, wherein at least one inside shell surface of the bent-over rim is covered by the ball socket.

15. The sleeve joint according to claim 13, wherein an angle enclosed by an inside wall of the outer sleeve and the bent-over rim is equal to or smaller than 90°.

16. The sleeve joint according to claim 13, wherein an inside diameter of the outer sleeve, in an area of the radially inwardly extending rim, is at least as large as a maximum diameter of the inner ball joint body.

* * * * *